(12) United States Patent
Tamura et al.

(10) Patent No.: US 6,570,727 B1
(45) Date of Patent: May 27, 2003

(54) METHOD AND APPARATUS FOR ERASING INFORMATION FROM A DISK WITHIN A MAGNETIC DISK DRIVE USING AN EXTERNALLY GENERATED MAGNETIC FIELD

(75) Inventors: Hitoshi Tamura, Chigasaki (JP); Hiroki Mori, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/423,106

(22) PCT Filed: Apr. 30, 1997

(86) PCT No.: PCT/JP97/01512
§ 371 (c)(1),
(2), (4) Date: Jan. 7, 2000

(87) PCT Pub. No.: WO98/49674
PCT Pub. Date: Nov. 5, 1998

(51) Int. Cl.[7] ................................................. G11B 5/03
(52) U.S. Cl. ........................ 360/66; 360/137; 361/267; 361/149
(58) Field of Search .................. 360/66, 137; 361/267, 361/149, 150, 151

(56) References Cited

U.S. PATENT DOCUMENTS

| | | | | |
|---|---|---|---|---|
| 3,869,713 A | * | 3/1975 | Owens, Jr. | 360/22 |
| 4,847,727 A | * | 7/1989 | Spaman | 361/151 |
| 5,436,857 A | * | 7/1995 | Nelson et al. | 708/140 |
| 5,721,665 A | * | 2/1998 | Schultz | 361/149 |

OTHER PUBLICATIONS

Patent Abstract for Japanese application No. 05–175,824, Nec Corp., published on Jan. 31, 1995.*
Patent Abstract for Japanese application No. 60–129,909, Yoshimori, published on Jul. 11, 1985.*

* cited by examiner

*Primary Examiner*—Alan T. Faber
(74) *Attorney, Agent, or Firm*—Kunzler & Associates

(57) ABSTRACT

The object of the present invention is to provide a method and apparatus configured to allow an externally generated magnetic field to simultaneously erase a portion of the information on a disk, or a plurality of disks, within a magnetic storage device. The invention allows high throughput of erased magnetic storage devices, as in a mass production environment. Additionally, the invention allows a variety of magnetic storage device configurations in that the erasing is non-intrusive to the housing of the magnetic storage device and does not depend on the number of disks within the magnetic storage device.

35 Claims, 5 Drawing Sheets

METHOD AND APPARATUS FOR ERASING INFORMATION FROM A DISK WITHIN A MAGNETIC DISK DRIVE USING AN EXTERNALLY GENERATED MAGNETIC FIELD

BACKGROUND OF THE INVENTION

1. Field of the Invention

The present invention relates to a method and an apparatus for erasing information recorded on a disk of a magnetic disk device. More particularly, the present invention relates to a method and an apparatus for erasing servo data and test data used in fabrication steps, particularly in repairing steps, of a magnetic recording device.

2. Background Art

Servo data are written in servo data writing steps during the manufacturing process of magnetic disk devices. The manufacturing process also includes writing and testing test data. Defects in the servo data frequently cause disk drives to fail the drive tests. In these cases, generally the disk drive must be disassembled so that any reusable parts can be recovered and so as to avoid the environmental and financial costs of discarding the entire disk device. Recovering the disk is particularly important because disks are costly and it is difficult to recycle disks after they have been discarded.

Any servo or test data on the recovered disks generally must be erased before the disks can be incorporated into a new disk drive so as prevent interference with the new servo and test data that will be recorded on the disk.

Several conventional methods for erasing information recorded on a disk have been used including:

1. DC erase by a servo track writer;
2. DC erase by a dedicated erasing device; and
3. Erase by an erasing bar.

In servo track writer DC erase methods, information on the disk is erased by DC signals applied to a servo track writer write head. Although this method can completely erase the information on the disk, it is unsuitable for a mass production process since servo track writers are costly and large sized. Also servo track writer DC erase methods are comparatively slow.

Dedicated erasing devices provide a lower cost alternative to servo track writer DC erase methods. However, conventional dedicated erasing devices are generally too slow to be suitable for mass production processes.

In DC erase methods using an erasing bar, a bar on which a permanent magnet is mounted is inserted between the rotated disks to erase all of the information on the disks, as described in Japanese published patent application H7-29106. A problem with conventional erasing bar DC erase methods is that while they may be used with disk devices having a flat type base as shown in FIG. 2, the methods are not readily used with disk devices having a bath tub type base as shown in FIG. 3 since a space for inserting the erasing bar from a lateral direction is required. That is, in a disk device 200 shown in FIG. 2, a spindle motor 204 is mounted on a flat type base 202, and magnetic disks 206 and 208 are mounted on the spindle motor 204. Information written on disks 206 and 208 is erased by removing a top cover, not shown, and inserting the erasing bar 210 from a side of the disk device. In contradistinction, in the disk device 300 shown in FIG. 3, a spindle motor 304 is mounted on a bath tub type base 302, and magnetic disks 306 and 308 are mounted on the spindle motor 304. Even if a top cover, not shown, is removed, the sides of the disks are still covered by the bath tub type base 302, thereby preventing insertion of erasing bar 310.

A further drawback of DC erase methods using erasing bars is that the vertical position of the erasing bar must be precisely controlled due to the narrow spacing of the disks, and positional deviations can damage the disks. Furthermore, the space between disks is decreasing as a result of efforts to increase the storage capacity, and reduce the size of disk drives.

SUMMARY OF THE INVENTION

An object of the present invention is to provide a method and an apparatus for erasing information recorded on disks in magnetic disk devices irrespective of the shape of the base of the disk device.

Another object of the present invention is to provide a method and an apparatus for rapidly and reliably erasing information recorded on disks in magnetic disk devices.

A further object of the present invention is to provide an inexpensive system for erasing information on disks, while ensuring the disk device does not contact the magnets.

A method of erasing information recorded on a disk recording medium in a magnetic disk device comprising the disk recording medium, a motor for rotating the disk recording medium, a base attached to the motor, and a magnetic head, according to one embodiment of the present invention comprises generating a magnetic field outside of the magnetic disk device, and inserting the magnetic disk device into the magnetic field, wherein the magnetic field passes through the base to erase information recorded on the disk recording medium.

An apparatus for erasing information recorded on a disk recording medium in a magnetic disk device comprising the disk recording medium, a motor for rotating the disk recording medium, a base attached to the motor, and a magnetic head, according to one embodiment of the present invention comprises: a magnet to generate a magnetic field, and a handler to insert the magnetic disk device into the magnetic field.

DETAILED DESCRIPTION OF THE PREFERRED EMBODIMENTS

Figure 1:
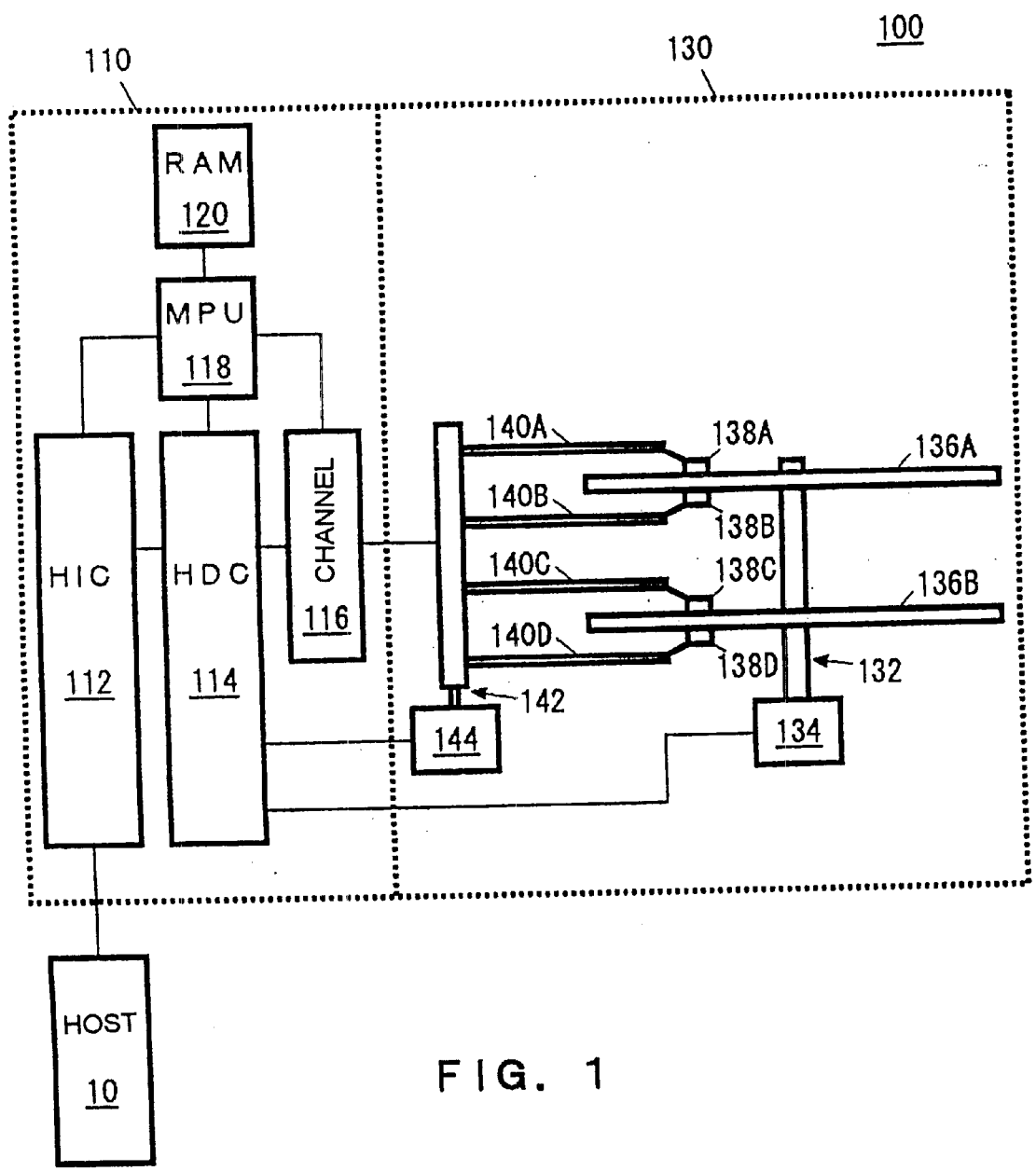
FIG. 1 shows a block diagram of a hard disk device (HDD) to which the present invention can be applied.

FIG. 1 shows a block diagram of a hard disk device (HDD) to which the present invention can be applied. Disk device 100 includes a control section 110 and a disk section 130. Control section 110 includes a host interface controller (HIC) 112 connected to a host system 10, a hard disk controller (HDC) 114 connected to host interface controller 112 for controlling disk section 130, a channel 116 connected to hard disk controller 114 for controlling read/write signals, MPU 118 connected to HIC 112, HDC 114 and channel 116 for controlling them, and RAM 120 connected to MPU 118 for storing microcode executed by MPU 118. Disk section 130 includes a motor 134 for rotating a spindle 132. Disks 136A and 136B are fixed on spindle 132 for integrally rotating with spindle 132. Two disks are shown in FIG. 1, but disk section 130 may include only one disk or more than two disks.

Heads 138A, 138B, 138C and 138D opposing each surface of the disks are supported by actuator arms 140A, 140B, 140C and 140D, respectively. Actuator arms 140A through 140D are attached to a voice coil motor (VCM) 144 through a pivot shaft 142. Heads 138A through 138D are moved to a desired position along a radial direction of the disks by the pivot shaft 142 rotation. Motor 134 and VCM 144 are connected to HDC 114 which controls their operation. Heads 138A through 138D are connected to channel 116, which controls the read/write signals.

Figure 2:
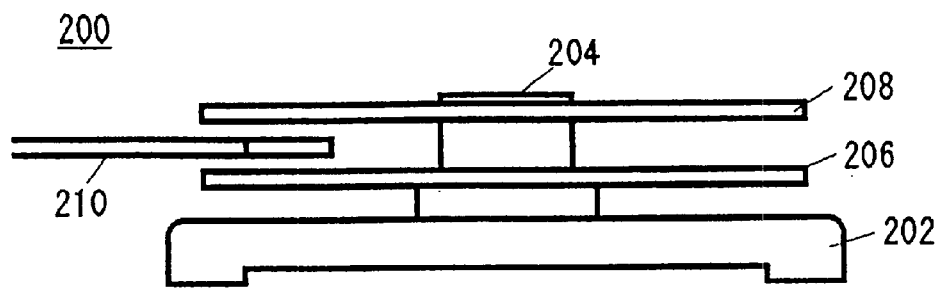
FIG. 2 shows a portion of a disk device with a flat type base.
Figure 3:
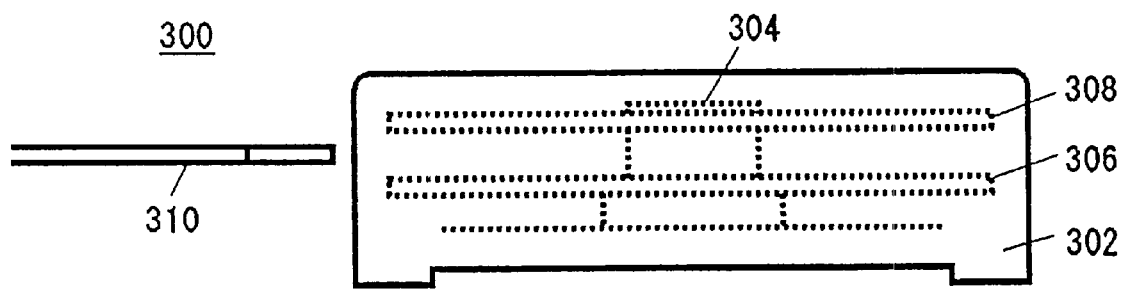
FIG. 3 shows a portion of a disk device with a bath tub type base.

Disk section 130 is covered by an enclosure to prevent any contamination from the outside atmosphere entering into disk section 130. The enclosure comprises a base and a top cover, not shown. Motor 134 and VCM 144 are fixed onto the base, as shown in FIG. 2 or FIG. 3. The flat type base, as shown in FIG. 2, or the bath tub type base, as shown in FIG. 3, are used as the base. A top portion and a side portion of the disk section 130 is covered by the top cover.

Figure 4:
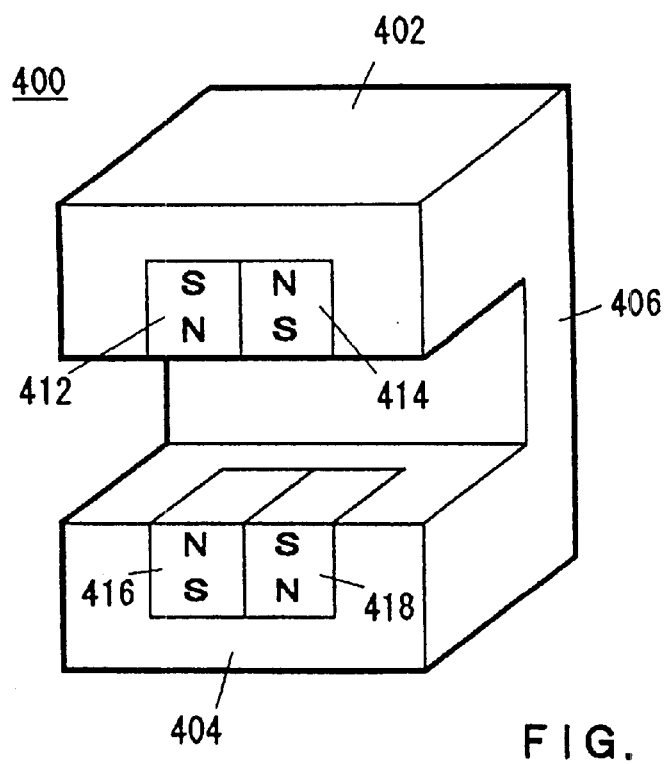
FIG. 4 shows an erasing apparatus for erasing information on disks in a disk device in accordance with an embodiment of the present invention.

FIG. 4 shows an erasing apparatus 400 for erasing information on disks in a disk device in accordance with an embodiment of the present invention. Erasing apparatus 400 includes a top portion 402 to hold magnets, a bottom portion 404 to hold magnets and a connecting portion 406. Permanent magnets 412 and 414 are fixedly attached to top portion 402, and permanent magnets 416 and 418 are fixedly attached to bottom portion 404. Permanent magnets 412 and 414 are adjacently positioned with their poles reversed. Permanent magnets 416 and 418 are also adjacently positioned with their poles reversed. Permanent magnets 412 and 416 are arranged on a common axis passing through them with their poles reversed along the common axis. The permanent magnets 414 and 418 are also arranged on a common axis passing through them with their poles reversed along the common axis. Connecting portion 406 couples top portion 402 and bottom portion 404 to fix the relative positions of the permanent magnets with respect to each other. Connecting portion 406 can be replaced by other means that fix the relative positions of the permanent magnets with respect to each other. In a preferred embodiment, permanent magnets 412, 414, 416 and 418 each comprise a permanent magnet of high magnetic flux density, for example Nd—Fe—B N—42 magnet fabricated by Tokin Corp. Electromagnets can also be used in place of the permanent magnets.

Figure 5:
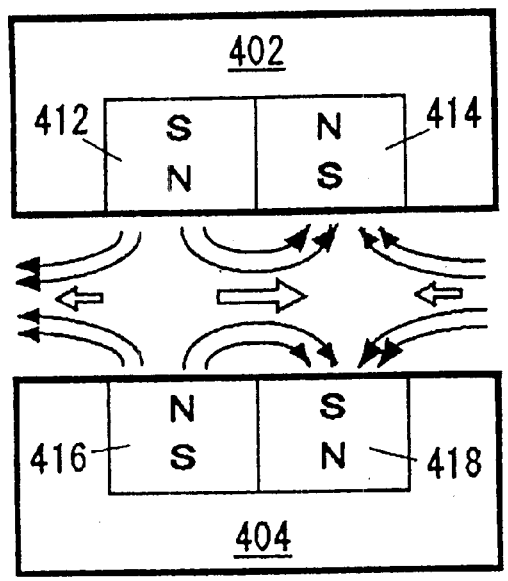
FIG. 5 shows a magnetic field generated by the FIG. 4 erasing apparatus in accordance with the present invention.

FIG. 5 shows a magnetic field generated by erasing apparatus 400. It is apparent that a relatively large magnetic field in a horizontal direction is generated in a center portion of the erasing apparatus 400. In this embodiment, the magnetic field directed from the left side to the right side is used, but a magnetic field in the opposite direction can be generated by changing the arrangement of the permanent magnets. A magnetic field directed in the vertical direction can be generated for application to vertical magnetic recordings.

Figure 7:
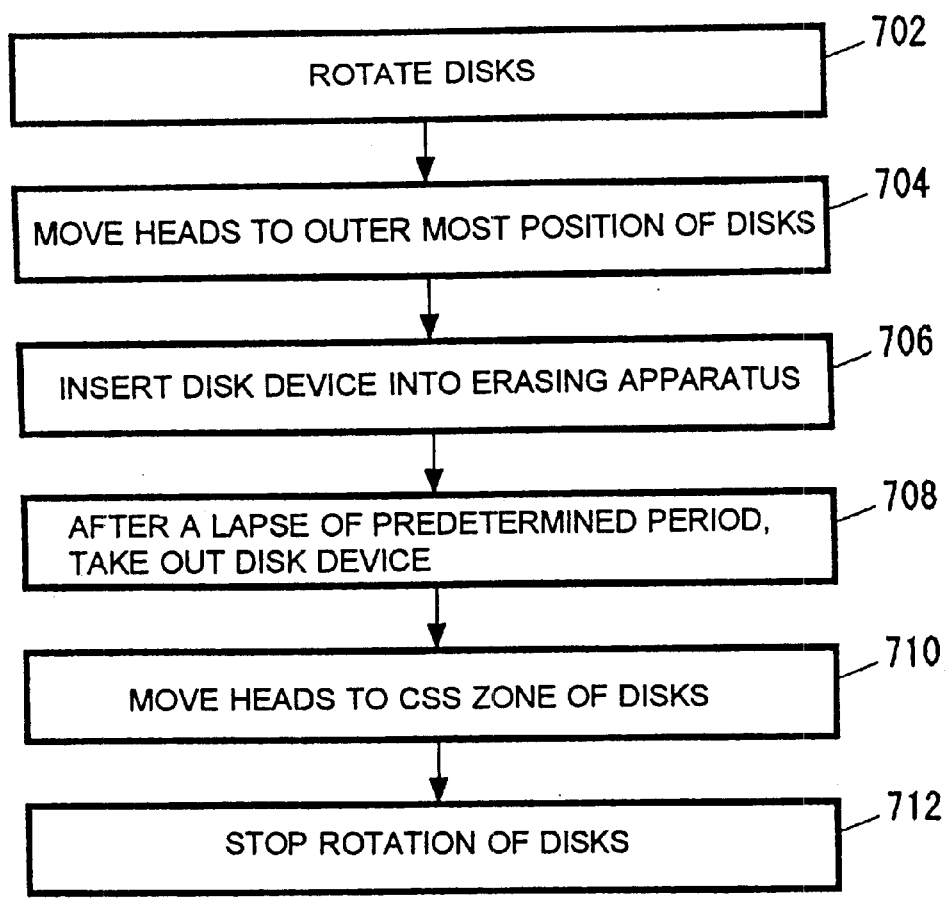
FIG. 7 shows a flow chart of a method of erasing information on disks in accordance with an embodiment of the present invention.
Figure 6:
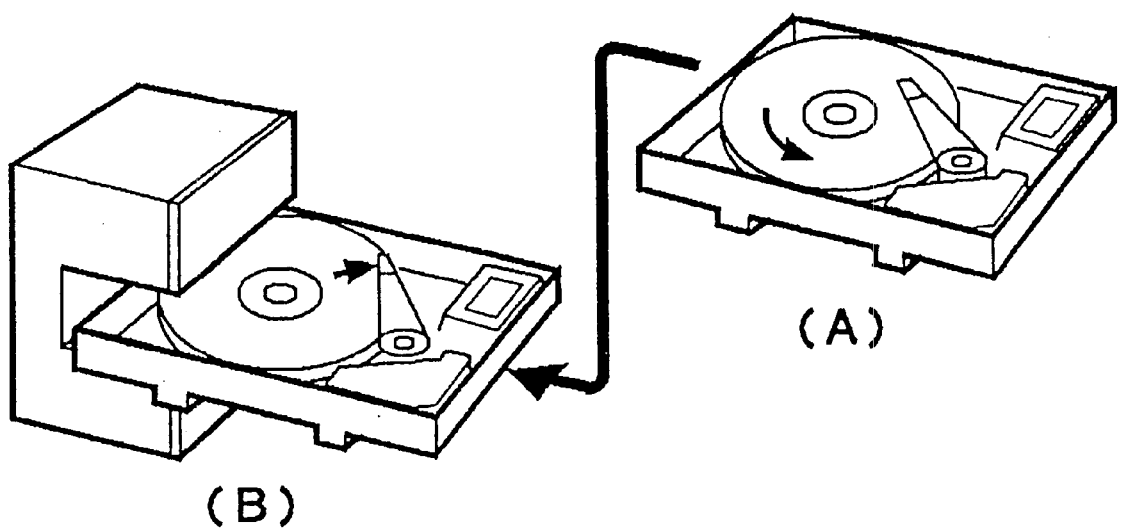
FIGS. 6(A) and 6(B) show a method of erasing the information on disks in accordance with an embodiment of the present invention.

FIGS. 6(A) and 6(B) show a method of erasing information on disks according to an embodiment of the present invention. FIG. 7 shows a flow chart of a method of erasing information on the disks according to an embodiment of the present invention. In step 702 in FIG. 7, the disks are rotated, as shown in FIG. 6(A). The disks can be rotated by activating motor 134, or by an external motor. Using an external motor is preferable where the rotation of the disks being erased, may be impaired due to eddy currents, as for example may occur with disks having an aluminum substrate. In step 704, the heads are moved to outer radial disk locations. Moving the heads in this manner away from the permanent magnets prevents adverse leakage flux in MR heads, which can damage the heads. If the heads are not vulnerable to leakage flux damage then step 704 can be omitted. In disk devices which have a load/unload mechanism for the heads, the heads can be unloaded in advance. Magnetic shields can be mounted on the side surfaces of the top portion 402 and the bottom portion 404 to prevent the magnetic flux leakage. In step 706, disk device 100 is inserted between top portion 402 and bottom portion 404 of erasing apparatus 400 to expose the disks to the fixed direction magnetic field to erase the information recorded on the disks, as shown in FIG. 6(B). In step 708, after a sufficient time period to erase the information on the entire surface of the disks, disk device 100 is removed from erasing apparatus 400. In step 710, the heads are moved to their respective contact start stop (CSS) zones. In step 712, disk rotation is stopped, and the erasing operation of the information on the disks is complete. Although the disk device without the top cover is shown in FIGS. 6(A) and 6(B), magnets sufficiently powerful to erase the disks with the top cover on can readily be used.

Figure 8:
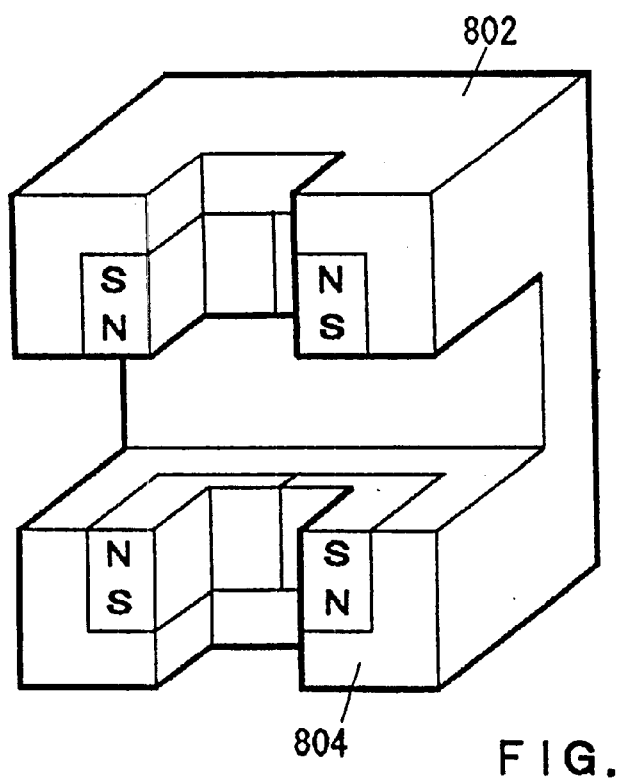
FIG. 8 shows an alternative embodiment for erasing information on disks in accordance with the present invention.

FIG. 8 shows an alternative embodiment of the present invention. This embodiment uses a U shaped top portion 802 and a U shaped bottom portion 804, and the permanent magnets form corresponding U shapes. U shaped top and bottom portions 802 and 804 reduce the magnetic flux leakage to the motor. Reducing magnetic flux leakage to the motor can prevent adverse effects on the motor such as leakage of a fluid magnetic seal, can be effectively prevented.

Figure 9:
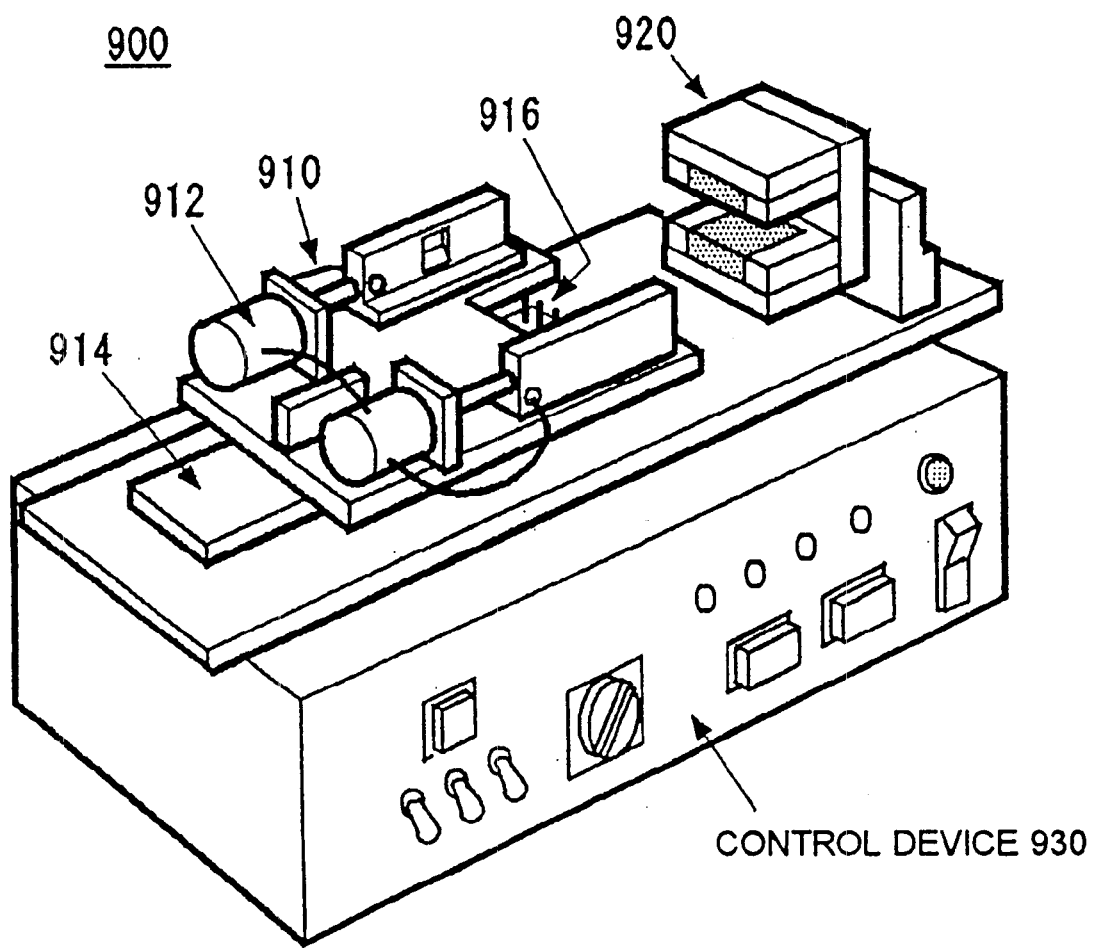
FIG. 9 shows a further alternative embodiment for erasing the information on disks in accordance with the present invention.

FIG. 9 shows a further alternative embodiment of the erasing apparatus of the present invention. As shown in FIG. 9, the erasing apparatus 900 for erasing the information on the disks includes a disk device insertion/removal section 910 and a magnet section 920. The disk device insertion/removal section 910 is connected to a control device 930 to fix the disk device by a clamp mechanism 912 and to automatically insert the disk device into the magnet section 920 or remove the disk device from the magnet section 920 by a feeding mechanism 914. Probe pins 916 supply the power to the spindle motor of the disk device to rotate the disks. Erasing apparatus 900 provides a reliable, inexpensive system for erasing information on disks, while ensuring the disk device does not contact the magnets.

In accordance with the present invention, the information recorded on the disks in the magnetic disk device can be erased irrespective of the shape of the base of the disk device; the information recorded on the disks in the disk device can be rapidly and reliably erased; and an erasing apparatus provides a reliable, inexpensive system for erasing information on disks, while ensuring the disk device does not contact the magnets.

The present invention completely erases all of the information recorded on each of a plurality of disks in disk devices, without requiring the disk devices to be disassembled, as demonstrated experimentally. Furthermore, embodiments of the present invention completely erase all of the information recorded on each of a plurality of disks in disk devices without removing the top cover. Such embodiments allow disks to be erased outside of a clean room environment.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of erasing information recorded on a disk recording medium in a magnetic disk device comprising said disk recording medium, a motor for rotating said disk recording medium, a base attached to said motor, and a magnetic head, comprising the steps of:
    generating a magnetic field outside of said magnetic disk device; and
    inserting at least a portion of said magnetic disk device into said magnetic field, wherein said magnetic field passes through said base to erase information recorded on said disk recording medium.

2. The method of erasing information recorded on a disk of claim 1, wherein said magnetic disk device is covered by an enclosure.

3. The method of erasing information recorded on a disk of claim 1, wherein said magnetic disk device includes at least two disks.

4. The method of erasing information recorded on a disk of claim 1, wherein said magnetic field is generated by at least one permanent magnet.

5. The method of erasing information recorded on a disk of claim 1, wherein said magnetic field is generated by at least one electromagnet.

6. The method of erasing information recorded on a disk of claim 1, wherein said magnetic field is directed along a direction substantially parallel to a plane formed by a recording surface of said disk recording medium.

7. The method of erasing information recorded on a disk of claim 1, wherein said magnetic field is directed along a direction substantially perpendicular to a plane formed by a recording surface of said disk recording medium.

8. The method of erasing information recorded on a disk of claim 1, wherein said magnetic field is generated by at least one substantially U shaped magnet so as to reduce magnetic flux exposure of said motor.

9. The method of erasing information recorded on a disk of claim 1 further comprising the step of rotating said disk recording medium while at least a portion of said magnetic disk device is in said magnetic field.

10. The method of erasing information recorded on a disk of claim 9, wherein said magnetic disk device is covered by an enclosure.

11. The method of erasing information recorded on a disk of claim 9, wherein said magnetic field is generated by at least one substantially U shaped magnet so as to reduce magnetic flux exposure of said motor.

12. The method of erasing information recorded on a disk of claim 9, wherein said magnetic disk device includes at least two disks.

13. The method of erasing information recorded on a disk of claim 9, wherein said magnetic field is generated by at least one permanent magnet.

14. The method of erasing information recorded on a disk of claim 9, wherein said magnetic field is generated by at least one electromagnet.

15. The method of erasing information recorded on a disk of claim 9, wherein said rotating step further comprises rotating said magnetic recording medium with a motor external to said magnetic disk device.

16. The method of erasing information recorded on a disk of claim 9, wherein said magnetic field is directed along a direction substantially perpendicular to a plane formed by a recording surface of said disk recording medium.

17. An apparatus for erasing information recorded on a disk recording medium in a magnetic disk device comprising said disk recording medium, a motor for rotating said disk recording medium, a base attached to said motor, and a magnetic head, comprising:
    means for generating a magnetic field; and
    means for inserting at least a portion of said magnetic disk device into said magnetic field through said base.

18. The apparatus for erasing information recorded on a disk of claim 17, wherein:
    said means for generating a magnetic field comprises a magnet; and
    said means for inserting comprises a magnetic disk device handler.

19. The apparatus for erasing information recorded on a disk of claim 17, further comprising a means for rotating said disk recording medium.

20. An apparatus for erasing information recorded on a disk recording medium in a magnetic disk device comprising said disk recording medium, a motor for rotating said disk recording medium, a base attached to said motor, and a magnetic head, comprising:
    a magnet to generate a magnetic field; and
    a handler to insert at least a portion of said magnetic disk device into said magnetic field, wherein said magnetic field passes through said base to erase information recorded on said disk recording medium.

21. The apparatus for erasing information recorded on a disk of claim 20, wherein said magnetic disk device is covered by an enclosure.

22. The apparatus for erasing information recorded on a disk of claim 20, wherein said magnet comprises a substantially U shaped magnet so as to reduce magnetic flux exposure of said motor.

23. The apparatus for erasing information recorded on a disk of claim 20, wherein said magnetic disk device includes at least two disks.

24. The apparatus for erasing information recorded on a disk of claim 20, wherein said magnet comprises a permanent magnet.

25. The apparatus for erasing information recorded on a disk of claim 20, wherein said magnet comprises an electromagnet.

26. The apparatus for erasing information recorded on a disk of claim 20, wherein said magnetic field is directed along a direction substantially parallel to a plane formed by a recording surface of said disk recording medium.

27. The apparatus for erasing information recorded on a disk of claim 20, wherein said magnetic field is directed along a direction substantially perpendicular to a plane formed by a recording surface of said disk recording medium.

28. The apparatus for erasing information recorded on a disk of claim 20, further comprising a motor, external to said magnetic disk device, to rotate said disk recording medium.

29. The apparatus for erasing information recorded on a disk of claim 28, wherein said magnetic disk device is covered by an enclosure.

30. The apparatus for erasing information recorded on a disk of claim 28, wherein said magnet comprises a substantially U shaped magnet so as to reduce magnetic flux exposure of said magnetic disk device motor.

31. The apparatus for erasing information recorded on a disk of claim 28, wherein said magnetic disk device includes at least two disks.

32. The apparatus for erasing information recorded on a disk of claim 28, wherein said magnet comprises a permanent magnet.

33. The apparatus for erasing information recorded on a disk of claim 28, wherein said magnet comprises an electromagnet.

34. The apparatus for erasing information recorded on a disk of claim 28, wherein said magnetic field is directed along a direction substantially parallel to a plane formed by a recording surface of said disk recording medium.

35. The apparatus for erasing information recorded on a disk of claim 28, wherein said magnetic field is directed along a direction substantially perpendicular to a plane formed by a recording surface of said disk recording medium.

* * * * *

UNITED STATES PATENT AND TRADEMARK OFFICE
CERTIFICATE OF CORRECTION

PATENT NO.     : 6,570,727 B1
DATED          : May 27, 2003
INVENTOR(S)    : Hitoshi Tamura et al.

It is certified that error appears in the above-identified patent and that said Letters Patent is hereby corrected as shown below:

Column 1,
Line 30, "so as prevent" should read -- so as to prevent --.

Column 4,
Line 15, "erased, may" should read -- erased may --.
Line 21, "damage then" should read -- damage, then --.
Lines 47-48, "seal, can be effectively prevented." should read -- seal. --.

Signed and Sealed this

Twenty-fifth Day of November, 2003

JAMES E. ROGAN
*Director of the United States Patent and Trademark Office*